(12) United States Patent
Heylen et al.

(10) Patent No.: US 7,334,268 B2
(45) Date of Patent: Feb. 19, 2008

(54) METHOD AND APPARATUS FOR DATA FILES USED IN THE TRANSMISSION OF INFORMATION

(75) Inventors: Richard A. A. Heylen, Leeds (GB); Mark Dominic Jackson, Chineham (GB); Peter Alfred Newman, Cavesham (GB)

(73) Assignee: Macrovision Europe Limited (GB)

( * ) Notice: Subject to any disclaimer, the term of this patent is extended or adjusted under 35 U.S.C. 154(b) by 550 days.

(21) Appl. No.: 10/504,558

(22) PCT Filed: Feb. 19, 2004

(86) PCT No.: PCT/GB2004/000643

§ 371 (c)(1),
(2), (4) Date: Aug. 13, 2004

(87) PCT Pub. No.: WO2004/075185

PCT Pub. Date: Sep. 2, 2004

(65) Prior Publication Data

US 2005/0193313 A1    Sep. 1, 2005

(51) Int. Cl.
    *H04L 29/00* (2006.01)
(52) U.S. Cl. .......................................... 726/33
(58) Field of Classification Search ............... 380/203; 726/33
    See application file for complete search history.

(56) References Cited

U.S. PATENT DOCUMENTS 4,603,413 A    7/1986    Sinjou et al.

(Continued)

FOREIGN PATENT DOCUMENTS

EP    0 347 934 A2    12/1989

(Continued)

OTHER PUBLICATIONS

EP Search Report dated Feb. 25, 2005 for EP 05 00 0302, 2 pages.

(Continued)

*Primary Examiner*—Kambiz Zand
*Assistant Examiner*—Andrew L Nalven

(57) ABSTRACT

It is proposed to copy protect data files for transmission by incorporating DSV data patterns, that is, data patterns which are difficult to encode without causing DSV problems, in the data files. The data in five audio streams and two video streams is placed, by way of encoders (10) and a multiplexer (12) into a stream of blocks of encoded data in the MPEG file format (14). In this format, blocks of video data V are arranged alternately with blocks of audio data A and padding stream blocks P. DSV data patterns (16) are incorporated into the MPEG file (14) by way of an encoder (18) to produce the copy protected data file (15). The DSV data patterns (16) are incorporated into locations within the MPEG file which have no data content such as padding stream blocks P and/or into unused audio data blocks A. The DSV data patterns incorporated within the data blocks fed either to a monitor or to a reproduction system will not interfere with the reproduction such that unfettered access is provided to the transmitted information. However, a CD or DVD writer will generally be caused to write a disc which, when read, will result in a reader returning corrupted data or information signalling a read error. Thus, the data in the MPEG file 14 has been copy protected.

14 Claims, 4 Drawing Sheets

U.S. PATENT DOCUMENTS

| | | | |
|---|---|---|---|
| 5,659,613 A | 8/1997 | Copeland et al. | |
| 5,699,434 A * | 12/1997 | Hogan | 705/57 |
| 5,703,858 A | 12/1997 | Mitchell et al. | |
| 5,748,119 A | 5/1998 | Ko | |
| 5,787,068 A | 7/1998 | Arps et al. | |
| 5,828,754 A | 10/1998 | Hogan | |
| 5,832,088 A | 11/1998 | Nakajima et al. | |
| 6,028,936 A | 2/2000 | Nillis | |
| 6,076,165 A | 6/2000 | Maenza | |
| 6,278,386 B1 | 8/2001 | Hogan | |
| 6,317,397 B1 | 11/2001 | Deguchi et al. | |
| 6,353,890 B1 | 3/2002 | Newman | |
| 6,421,750 B1 | 7/2002 | Gunther et al. | |
| 6,694,023 B1 * | 2/2004 | Kim | 380/203 |
| 6,782,190 B1 | 8/2004 | Morito | |
| 6,839,312 B2 | 1/2005 | Heylen et al. | |
| 6,966,002 B1 * | 11/2005 | Torrubia-Saez | 726/29 |
| 7,030,788 B2 * | 4/2006 | Aida et al. | 341/59 |
| 2001/0011237 A1 | 8/2001 | Tanaka et al. | |
| 2002/0076046 A1 * | 6/2002 | Heylen | 380/203 |
| 2005/0163315 A1 | 7/2005 | Jackson et al. | |
| 2005/0193313 A1 | 9/2005 | Heylen et al. | |
| 2005/0226412 A1 | 10/2005 | Selve et al. | |

FOREIGN PATENT DOCUMENTS

| | | |
|---|---|---|
| EP | 0 347 934 A3 | 12/1989 |
| EP | 0 347 934 B1 | 12/1989 |
| EP | 0 791 923 A2 | 8/1997 |
| EP | 0 791 923 A3 | 8/1997 |
| EP | 0 854 482 A1 | 7/1998 |
| EP | 0 854 482 B1 | 7/1998 |
| EP | 0918326 | 5/1999 |
| EP | 1011103 A1 | 6/2000 |
| EP | 1 355 306 A1 | 10/2003 |
| EP | 1355306 A1 | 10/2003 |
| EP | 1 396 857 A1 | 3/2004 |
| EP | 1418584 A1 | 5/2004 |
| EP | 1 494 235 A1 | 1/2005 |
| EP | 1505598 A1 | 2/2005 |
| EP | 1521262 A1 | 4/2005 |
| GB | 2397687 A | 7/2004 |
| GB | 2 369 718 B | 8/2004 |
| JP | 2002-175662 A | 6/2002 |
| WO | WO 98/02885 | 1/1998 |
| WO | WO-98/54713 A1 | 12/1998 |
| WO | WO 98/57413 | 12/1998 |
| WO | WO 00/74053 | 12/2000 |
| WO | WO-02/11136 A1 | 2/2002 |
| WO | WO-03/085668 A1 | 10/2003 |
| WO | WO-2004/066294 A1 | 8/2004 |
| WO | WO-2004/075185 A1 | 9/2004 |
| WO | WO-2004/075186 A2 | 9/2004 |

OTHER PUBLICATIONS

Schouhamer Immink KA: "Efmplus; The Coding Format of the Multimedia Compact Disc" IEE Transaction on Consumer Electronics IEEE Inc New York vol. 41, No. 3 Aug. 1, 1995 pp. 491-497.

Kalker T: "System Issues in Digital Image and Video Watermarking for Copy Protection" Multimedia Computing and Systems 1999; IEE International Conference on Florence, Italy Jun. 7-11, 1999, Los Alamitos , CA USA IEEE Coomput. Soc, US Jun. 7, 1999 pp. 562-567.

GB Examination Report for GB Application No. 0401496.5 dated May 19, 2005, one page.

GB Examination Report for GB Application No. 0403721.4 dated Jun. 9, 2005, one page.

International Search Report mailed on Oct. 25, 2001 for PCT Application No. PCT/GB01/03364 filed on Jul. 26, 2001, two pages.

Menezes, A.J. et al. (1997). "Overview of Cryptography" Chapter 1 *In Handbook of Applied Cryptography*. CRC Press: Boca Raton, FL., pp. 20-23.

\* cited by examiner

METHOD AND APPARATUS FOR DATA FILES USED IN THE TRANSMISSION OF INFORMATION

CROSS REFERENCE TO RELATED APPLICATIONS

The present invention relates to a method of copy protecting data files for the transmission of information and to a data file to be used in the transmission of information.

Increasingly it is required to make information, such as films, music videos, games and other multimedia presentations, available electronically. For example, such information content may be transmitted by way of the internet, by broadcast TV, or by cable for display on the screen of a computer or by a television set. Thus, it may be required to make a film available electronically to a user on the payment of an appropriate fee.

However, recordable CDs and CD writers for writing to such recordable discs are readily available to the domestic consumer and recordable DVDs and DVD writers are expected to become as readily available in the short term. There is therefore the risk that when information content of the type described is made available in electronic form, for example, by way of the internet, the consumer may be enabled not only to use the content as intended but also to make copies thereof onto appropriate optical discs.

There is therefore a need to control the use to which the transmitted information can be put.

The present invention seeks to provide a method of copy protecting data files for the transmission of information.

Throughout the specification and claims, the term "DSV data patterns" means data patterns which are likely to be difficult to encode without the encoded data causing DSV problems.

Thus, when "DSV data patterns" are encoded and written to an optical disc, for example, by a writer, a reader or player of encoded data incorporating the DSV data patterns will experience DSV problems.

According to a first aspect of the present invention there is provided a method of copy protecting data files for the transmission of information, where the information has been encoded into a data file having a format suitable for transmission, the method comprising incorporating into the data file DSV data patterns as hereinbefore defined, the DSV data patterns being chosen and located such that the data file cannot be accurately written to an optical disc.

The applicants have found that the inherent limitations of currently available CD and DVD writers can be used in copy protection techniques. Thus, and as described in their earlier application No. WO 02/11136, the applicants have found that it is possible to provide DSV data patterns which, because of their size and/or nature, cannot be accurately written onto a disc by a writer for recordable discs such that the disc remains reliably readable. However, the much more sophisticated encoders used in mastering houses, for example, the encoder which controls a laser beam recorder, can be controlled to accurately write the DSV data patterns to the glass master.

The encoder associated with a laser beam recorder has a relatively large amount of memory and processing power at its disposal. Specifically, the encoder uses sophisticated algorithms to analyse the information, including the DSV data patterns, which is to be encoded and written to the disc. The purpose of these algorithms is to ensure that this information is encoded onto the glass master in a manner which ensures that the information on the discs produced using this glass master can be read correctly by all CD and DVD readers. For a CD, the encoder chooses the merge bits which are interspersed in the encoded data as part of the encoding process and the chosen merge bit pattern ensures the readability of the replica discs made from the glass master. Similarly, for a DVD, the encoder chooses the sequence of channel bits to ensure readability. These sophisticated encoders can compromise the readability of one area of disc slightly, to ensure the readability of another area of disc, the overall effect being to ensure that the whole disc has a uniformly high readability.

By contrast, commercially available CD and DVD writers are limited in the processing power and memory which can be brought to bear on the problem of encoding the data. Specifically, the encoder built into a writing device contains simpler encoding algorithms because complicated algorithms require more processing power, more memory and they are more expensive to design, write and debug which reduces the profit margin on the writer. These simpler encoding algorithms may not make the ideal choices for merge bits or the sequence of channel bits even when the better choices are readily available. If one area of disc is easy to encode so as to ensure high readability and the following region is difficult to encode and would have a low readability, the simple encoders in writers do not have the foresight to trade-off the readability of one area with another and the result is that the easily encoded region is encoded well and the region which is difficult to encode is encoded badly and when the disc is read, errors are found in this latter region.

In the applicants' earlier application No. WO 02/11136, an authenticating signature is applied to an optical disc, the signature having been chosen to utilise the inherent limitations of currently available disc writers and to provide DSV problems.

In their copending application No. 0304015.1, filed on 21 Feb. 2003, the applicants describe and claim the provision of DSV data patterns in an application file to be carried on an optical disc, such that these DSV data patterns work with the inherent limitations of optical disc writers to provide copy protection for the application carried on the optical disc.

With embodiments of the present application, DSV data patterns are incorporated into data files for transmission. Where these data files are received, for example, at a user computer or by a player of the transmitted data, they can be accessed and used without difficulty. However, if the user writes the received data files to an optical disc the resultant copy will have readability problems such that it will be difficult to play or use the information recorded on the optical disc.

There may be circumstances where, for example, it is required to transmit the data file, which incorporates the DSV data patterns, to a mastering house so that the data file can be applied to a glass master. However, the encoder associated with the laser beam recorder should be able to write the data file to the glass master in a manner to ensure readability. Alternatively, and if required, a special encoder could be used to write the data file to disc. In either case, the resulting optical discs will, in their turn, be copy protected by the incorporated DSV data patterns.

In an embodiment, the data file comprises a stream of blocks of encoded data, and the method further comprises incorporating the DSV data patterns into one or more selected blocks in the stream which do not have information content.

Preferably, the DSV data patterns are only incorporated into part of the or each selected block.

The data file format may be, for example, MPEG, Windows compressed media files, AVI files or any other file format for encoding and compressing video.

Preferably, the DSV data patterns are chosen to cause DSV problems for optical disc writers.

For example, the DSV data patterns may be chosen to ensure that the DSV has a significant absolute value.

In an embodiment, the DSV data patterns are repeated patterns of values. These patterns of values may be randomly chosen.

The size of the DSV data patterns may be a predetermined amount.

It is generally thought that the effectiveness of the DSV data patterns is maximised where the DSV data patterns are arranged to produce a DSV which has a rapid rate of change.

In addition, it is preferred that the DSV data patterns are arranged to produce a DSV which has a substantial low frequency component.

As is well known, the information in the data file may comprise one or more of: audio data, numerical data, text data, video data, graphics data, program data, animation data and/or any other data.

According to a further aspect of the present invention there is provided a data file to be used in the transmission of information, the data file comprising a stream of blocks into which the information has been encoded, and wherein DSV data patterns as hereinbefore defined have been incorporated into one or more selected blocks in said stream of blocks.

In an embodiment, the DSV data patterns have only been incorporated into part of the or each selected block.

Preferably, the DSV data patterns have only been incorporated into selected blocks which are without information content.

The data file may have, for example, the format of MPEG, Windows compressed media files, AVI files or any other file format for encoding and compressing video.

Where the data file is in MPEG format and the stream of blocks comprises video data, audio data and padding stream blocks arranged alternately, the DSV data patterns are preferably incorporated in selected blocks without information content. For example, the DSV data patterns may be incorporated in padding stream blocks and/or in unused audio data blocks.

Preferably, said DSV data patterns have been chosen to cause DSV problems for optical disc writers.

In an embodiment, the DSV data patterns are chosen to ensure that the DSV has a significant absolute value.

The DSV data patterns may be repeated patterns of values.

The size of the DSV data patterns may be a predetermined amount.

It is preferred that the DSV data patterns are arranged to produce a DSV which has a rapid rate of change. It is currently thought that this is the most effective way to ensure reading problems for copy discs.

Preferably, the DSV data patterns are arranged to produce a DSV which has a substantial low frequency component.

The present invention also extends to an optical disc carrying a data file as defined above.

An optical disc of the invention may be a legitimate, copy protected optical disc, which has been produced using an encoder able to record and encode the DSV data patterns without providing readability problems on the resultant disc. Alternatively, an optical disc of the invention may be a copy disc produced by a CD or DVD writer.

The present invention also extends to a storage device containing a data file as defined above.

For example, the data file may be contained on the hard disc or in other memory of a user's computer or of a server.

Embodiments of the present invention will hereinafter be described, by way of example, with reference to the accompanying drawings, in which.

The copy protection technique of this invention relies upon the use of DSV data patterns as described, for example, in WO 02/11136. A brief description explaining DSV and how it is utilised now follows. This description begins specifically by reference to the encoding of a CD-ROM. However, it will be appreciated that the present invention is not limited to use with a CD-ROM and finds application to all data carrying optical discs. Specifically, the invention is applicable to all formats of CDs and to all formats of DVDs.

Figure 1:
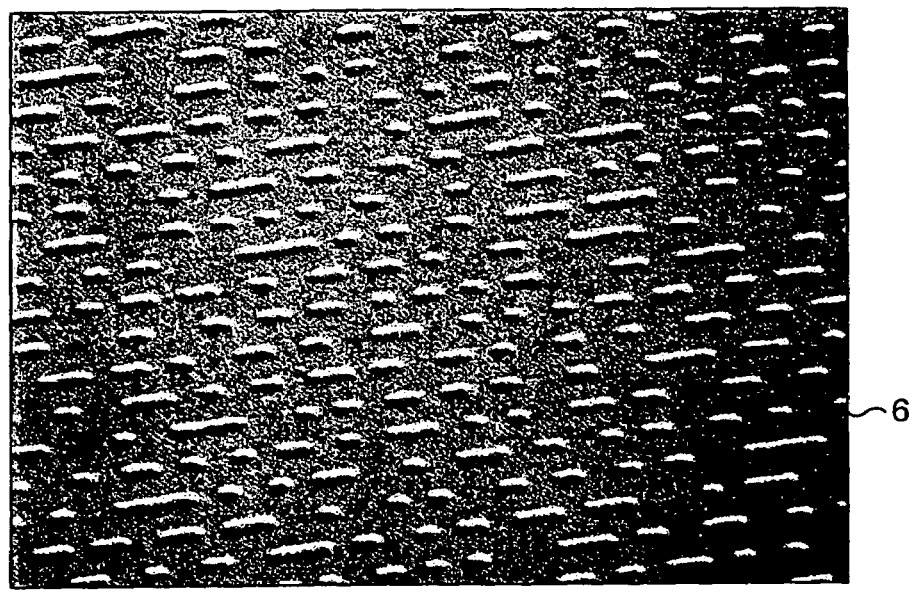
FIG. 1 shows the surface of a compact disc, very much enlarged, showing the pits thereon.

FIG. 1 shows an enlarged view of part of a CD showing the pits 6 thereon. As is well known, these pits extend along a spiral track on the surface of the disc and are separated by lands.

Figure 2:
FIG. 2 shows a cross-section of a pit illustrating the data associated therewith.

FIG. 2 shows a section through a pit 6 and land 8 illustrating how data is encoded on a CD. The pits and lands do not represent binary 0s and 1s, but instead represent transitions from one state to another. The data signal is stored in NRZI form (Non-Return to Zero Inverted), where the signal is inverted every time a 1 is encountered. FIG. 2 shows the binary value 00100010.

The data stream always consists of pits and lands of at least 3 bits and at most 11 bits long. This is sometimes referred to as a 3T-11T where T is a 1 bit period. A 3T pit has the highest signal frequency (720 khz) and an 11T pit has the lowest signal frequency (196 khz).

A data signal is derived from the lengths of the pits and lands. The produced signal forms a square wave known as an EFM signal. The digital sum value (DSV) is the running difference between the number of T values where the EFM represents a pit and the number of T values where the EFM represents a land. As each data bit is read, the DSV is incremented or decremented depending upon whether the data bit corresponds to a pit or a land.

Figure 3:
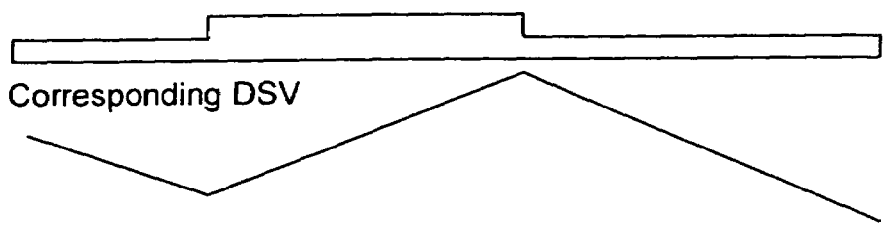
FIG. 3 shows the DSV associated with pits and lands of a compact disc.

FIG. 3 shows the DSV associated with pits and lands on a disc. As is indicated in FIG. 3, the DSV is determined by assigning the value +1 to each land T, and −1 to each pit T. Ideally, the DSV should stray as little as possible from the zero level. If the DSV has a rapid rate of change over a significant period of time or if the DSV has substantial low frequency components then the transitions in the EFM signal may be shifted from their ideal values and/or the ability of tracking and focus circuits in CD drives to maintain optimal head positioning may be compromised. This typically causes read failures from the CD.

Original data, in 8 bit bytes, is passed through a process called EFM encoding to produce the 14 bit symbols, often referred to as channel bits. The set of 14 bit symbols is especially designed:

to level out the number of pits and lands, to help maintain balanced DSV; and to ensure that there are no symbols which break the EFM coding scheme of 3T-11T.

Another way of regarding the 3T-11T coding scheme is that the number of successive zeros must be greater than or equal to two and less than or equal to ten. It is immediately apparent that this requirement may be compromised where two 14 bit symbols follow one after the other. Accordingly, a set of 3 merge bits are added between each 14 bit symbol and the one following to ensure that there are no violations of the 3T-11T coding scheme and to ensure that a suitable DSV is maintained.

The merge bits contain no useful data and the algorithm used to generate their values can differ from drive to drive. Once read, the merge bits are discarded and the data contained in the 14 bit symbol is passed onto the next process.

The above describes the basic encoding scheme for a CD and will be known to those skilled in the art. Accordingly, further explanation thereof is not required.

As set out above, embodiments of this invention utilise the inherent limitations of currently available CD or DVD writers.

The encoding of a CD is subject to two rigorous conditions and one more vague requirement. The first strict rule is that the encoded data must decode without errors into the data which the provider of the content wanted on the disc.

The second strict rule is that the encoding must obey the run-length limiting rules so that no pits or lands are longer than 11T or shorter than 3T. The vague requirement is that the DSV characteristics of the disc should be as good as possible.

As set out above, DSV is a property of the encoded data. It is a running difference between the number of pit T states and the number of land T states. It is desirable that the DSV should not have high absolute values, should not change rapidly, and should not have low frequency components. This latter requirement means that the DSV should not oscillate in a regular fashion.

In order to maintain good DSV characteristics, the encoder often has a choice in the merge bits to insert between the symbols which carry the data. When encoding certain special patterns of data, the encoder has a very much reduced ability to choose merge bits because the run-length limiting rules place limitations on the merge bits which can precede or follow certain symbols. The encoder effectively loses much of its control of the DSV while this data is being encoded. It is critical that it chooses correctly in the few locations where it has a choice.

A sophisticated encoder, such as those which control laser beam recorders, may have the foresight, or can be designed, to choose a pattern of merge bits which is not optimal for the immediate locality where this area is followed by one in which the run length limiting rules dictate the merge bits. The result will be that the overall DSV for the two areas will have better properties. The ability to detect upcoming areas where the merge bit choices are limited is called "lookahead". Encoders with a larger look-ahead will be able to make more preparations for encoding the troublesome data and hence the overall encoding will be better. CD writers typically have very little ability to look ahead and hence when they lose control of the DSV, it is more likely to result in an unreadable disc.

The applicants have identified a number of symbol values which are capable of causing DSV problems because of their EFM pattern at the pits and lands level. When the patterns for these values are processed through the EFM decoder of a CD drive, the DSV accumulates or decrements and this can result in read failures. Of course, and as indicated above, the encoding process for a CD is designed to prevent values capable of causing DSV problems occurring in the EFM pattern as well as providing robust error correction.

As will also be well known, DVDs are subject to encoding known as EFMPlus. In this scheme the 8 bit data words are encoded into 16 bit channel bits and state machines are used to choose the 16 bit symbols. As this choice can be made so that the coding scheme is not compromised, a flexibility given by the increased number of bits in each symbol, merge bits are not required.

On decoding, the information that was present in the 8 bit data words is recreated but the encoding scheme is lost.

As set out above, this invention proposes that DSV data patterns, that is, data patterns which are difficult to encode without causing DSV problems, be incorporated in data files for transmission. The invention is described below and illustrated with specific reference to the incorporation of DSV data patterns into MPEG files. However, the invention is not limited to use with MPEG files and can be used with any file format for encoding digital information. Where the information is, for example, video and/or audio, the file format may be Windows compressed media files or AVI files.

Figure 4:
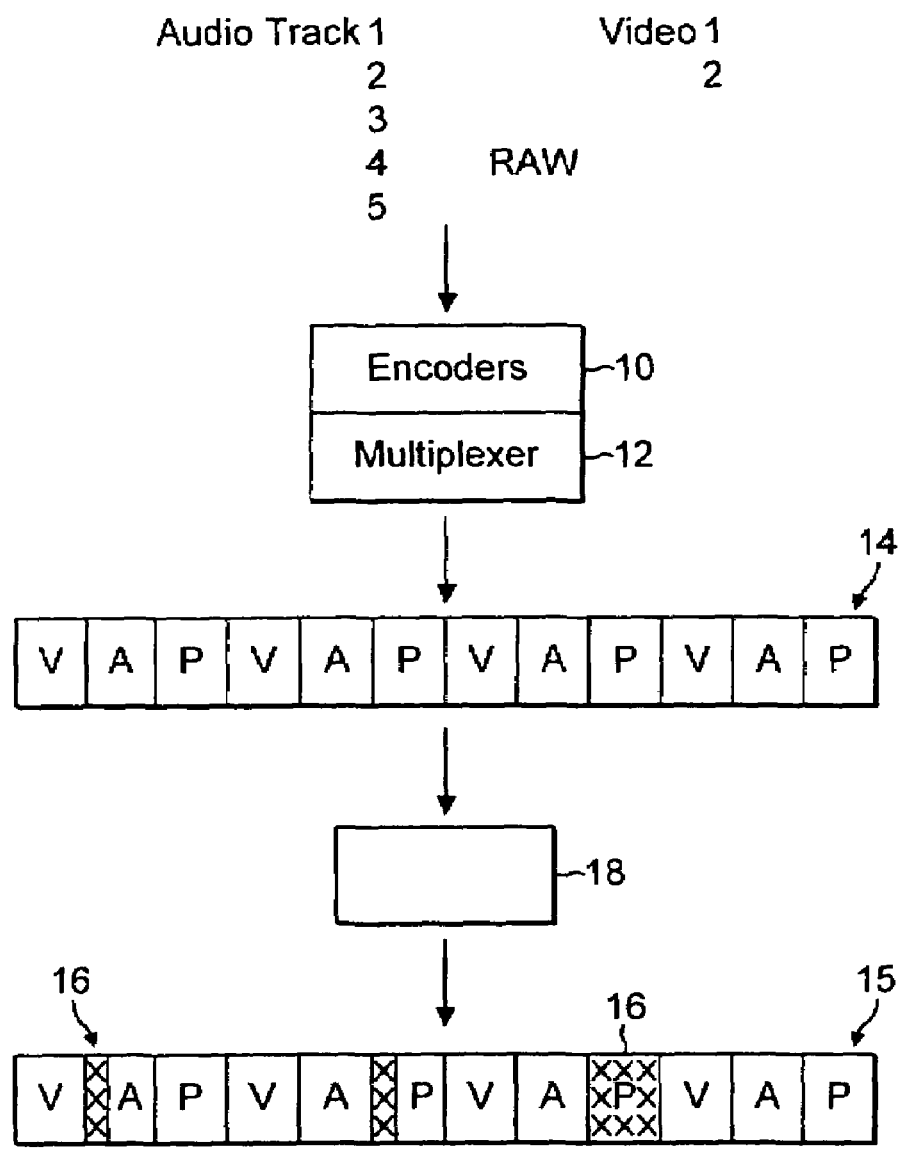
FIG. 4 shows the provision of a data file in MPEG format and the application of DSV data patterns thereto.

FIG. 4 shows schematically the arrangement of audio and video data into an MPEG file 14 and the subsequent application of DSV data patterns thereto. In this respect, the file format shown specifically is MPEG 2, which is currently widely used for the transmission of video, but the invention is equally applicable to other types of MPEG file.

As is shown in FIG. 4, the data in five audio tracks and two video tracks is placed, by way of encoders 10 and a multiplexer 12 into a stream of blocks of encoded data in the MPEG file format which is indicated at 14. In this format, blocks of video data V are arranged alternately with blocks of audio data A and with padding stream blocks P.

As is illustrated in FIG. 4, DSV data patterns, indicated at 16, are incorporated into the MPEG file 14 by way of an encoder 18 to produce the copy protected data file 15. The DSV data patterns 16 are incorporated into locations within the MPEG file which have no data content. Thus, and as illustrated, the DSV data patterns may be incorporated into padding stream blocks P and/or into unused audio data blocks A. The DSV data patterns 16 may be incorporated such that they completely fill each of the selected blocks A and/or P or the DSV data patterns 16 may be accommodated in part only of each selected block A, P. Additionally, and/or alternatively, the DSV data patterns may be inserted in blocks containing data but in an unused area thereof.

FIG. 4 illustrates the incorporation of DSV data patterns into the MPEG file 14 after the MPEG file has been created. Of course, the DSV data patterns may alternatively be incorporated within the MPEG file during its creation.

Figure 5:
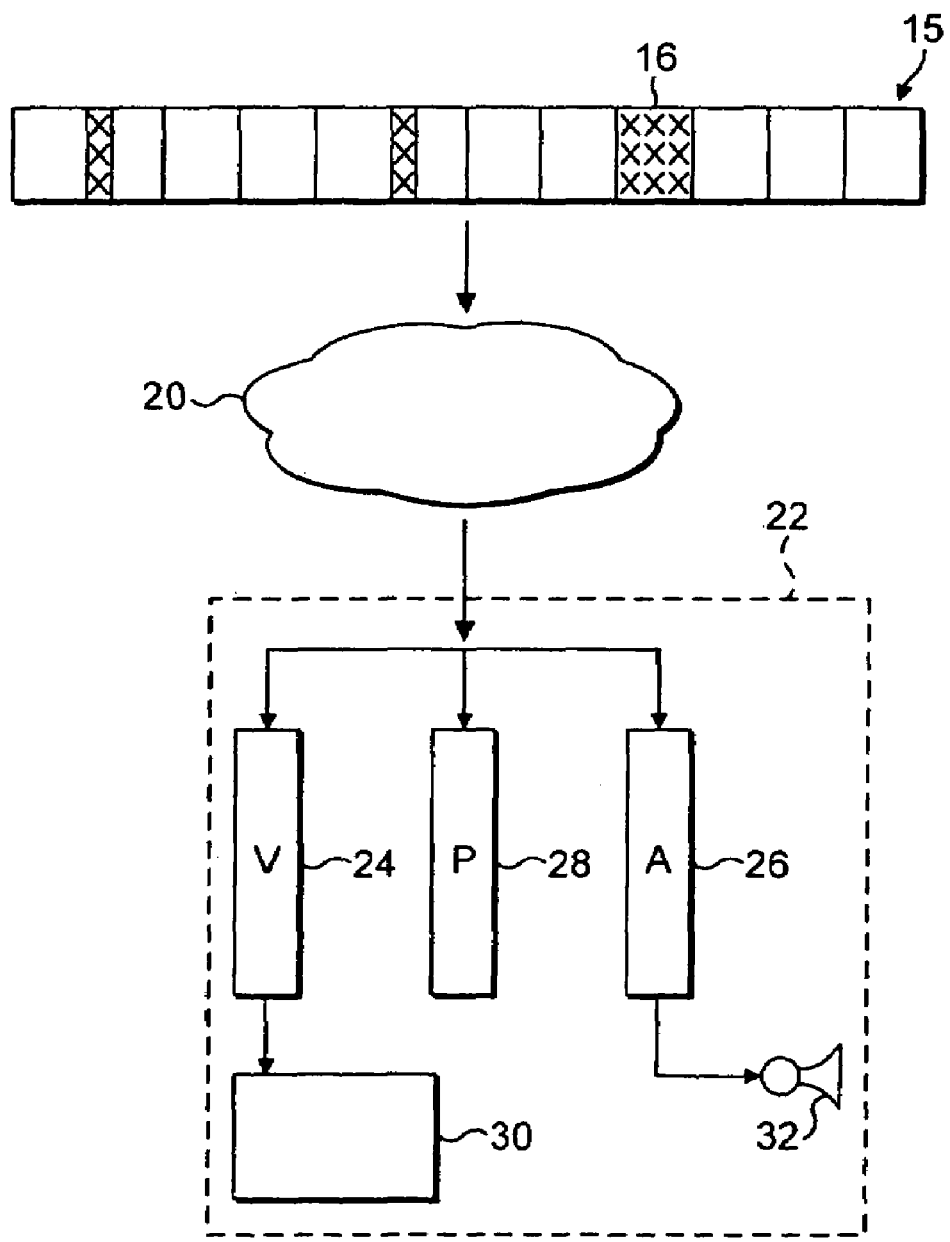
FIG. 5 shows schematically the transmission and decoding of the copy protected data file of FIG. 4.

FIG. 5 shows schematically the transmission of a copy protected MPEG file 15 which incorporates the DSV data patterns 16. The data file 15 is transmitted by transmission means, indicated at 20, to a receiver, indicated at 22. The transmission means 20 may be the internet, broadcast or satellite TV, cable TV, or an alternative network. The receiver 22 is, as is well known, provided with three buffers 24, 26 and 28. The buffer 24 receives the video blocks, the buffer 26 receives the audio blocks, and the buffer 28 receives the padding stream blocks. The video data from the buffer 24 is applied to a monitor 30 for display whilst the audio data from the buffer 26 is applied to an audio reproduction system indicated at 32. In this respect, the DSV data patterns incorporated within the blocks fed either to the monitor 30 or to the reproduction system 32 will not interfere with the reproduction such that the consumer will have unfettered access to the transmitted information.

Figure 6:
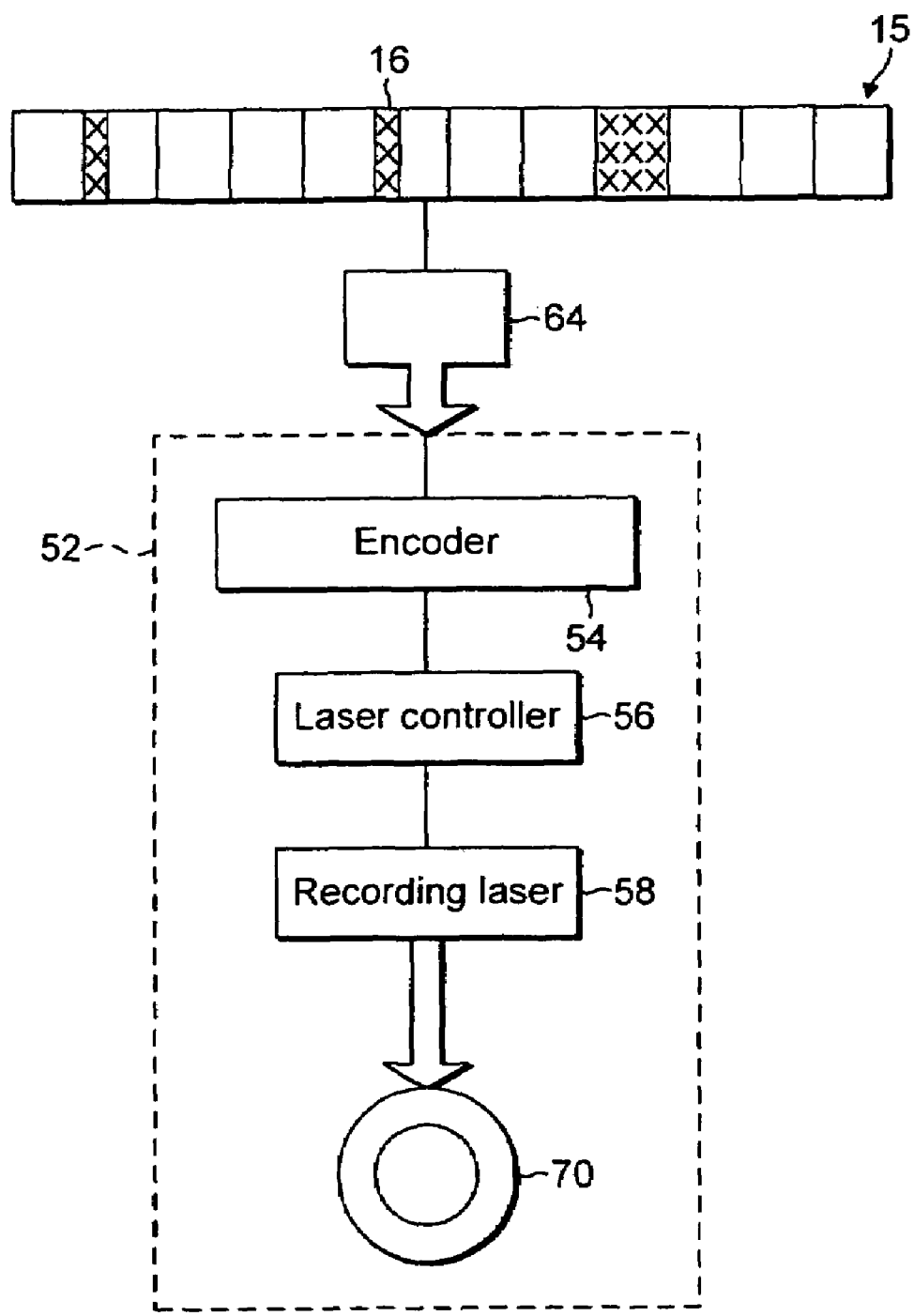
FIG. 6 indicates the recording of the data file of FIG. 4 onto an optical disc.

FIG. 6 shows a writer 52 which is to be used to make a copy of the copy protected MPEG file 15. In this respect, it is assumed that the MPEG file 15 has been stored in memory 64 in a receiver computer. Alternatively, the MPEG file 15 may be stored on hard disc. The data in the MPEG file 15 is encoded by encoder 54 and then written to a recordable optical disc 70, say a CD-R, or a DVD-R, by way of a recording laser 58 and its controller 56. However, the data file 15 incorporates the DSV data patterns 16 and the writer 52 will have difficulty writing the data to the disc 70 without producing a resultant disc which has severe readability problems. Accordingly, the writer 52 will write a disc which, when read, will result in a reader returning corrupted data or information signalling a read error. In this manner, therefore, the data in the MPEG file 14 has been copy protected.

Of course, there may be instances where it will be required to transmit the copy protected MPEG file 15 to, for example, a mastering house for its application to a glass master. Although the mastering process will then look the same as is illustrated in FIG. 6, the result will be different in that the encoder, as 54, used at the mastering house will generally be sophisticated enough to write the MPEG file 15 with its incorporated DSV data patterns without producing a disc with readability problems. Alternatively, a special encoder can be used to ensure that there are no readability problems with the discs produced from the glass master.

Where the invention is to be used, as indicated in FIG. 5, to allow the safe transmission of video for local use but to prevent the data from being accurately written to an optical disc, the DSV data patterns incorporated in the data file can be very robust and arranged to have maximum effect on a disc writer. Where it is intended that the transmitted MPEG file will be recorded legitimately onto a disc, for example, onto a glass master, care will need to be taken as to the number and locations of the DSV data patterns to ensure that there will be no readability problems with the resulting discs.

It will be apparent that if an MPEG file, as 15, with incorporated DSV patterns, is encoded onto an optical disc, that disc will be copy protected. In this respect, the application of files incorporating DSV data patterns to optical discs to copy protect the information therein is described in the applicants' copending application No. 0304015.1, filed on 21 Feb. 2003. As noted in that copending application, the application of an MPEG file, for example, incorporating DSV data patterns provides copy protection for the information on the optical disc and is of particular relevance to the rental industry for CDs and DVDs.

It will be appreciated that variations in, and modifications to, the embodiments as described and illustrated may be made within the scope of the accompanying claims.

The invention claimed is:

1. A method of copy protecting data files for the transmission of information content, where the information content has been encoded into a data file comprising a stream of blocks and having a format suitable for transmission, the method comprising:

incorporating into the data file DSV data patterns, the DSV data patterns being chosen and located such that the data file cannot be accurately written to an optical disc such that it can be reliably read back, wherein the DSV data patterns are in selected blocks of the data file which do not include the information content, the selected blocks each being a block designated as an audio block but which does not include audio information content.

2. A method according to claim 1, wherein the DSV data patterns are only incorporated into part of each selected block.

3. A method according to claim 1, wherein the data file format is MPEG, Windows compressed media files, or AVI files.

4. A method according to claim 1, wherein the DSV data patterns cause DSV problems for optical disc writers.

5. A method according to claim 1, wherein the DSV data patterns ensure that the DSV has a significant absolute value.

6. A method according to claim 1, wherein the DSV data patterns are repeated patterns of values.

7. A method according to claim 1, wherein the size of the DSV data patterns is predetermined.

8. A method according to claim 1, wherein the DSV data patterns produce a DSV which has a rapid rate of change.

9. A method according to claim 1, wherein the DSV data patterns produce a DSV which has a substantial low frequency component.

10. A method according to claim 1, wherein the information content to be transmitted comprises one or more of: audio data, numerical data, text data, video data, graphics data, program data, or animation data.

11. A data file copy protected by the method of claim 1.

12. A method according to claim 1, wherein the data file is in MPEG format and the stream of blocks comprises video data, audio data, and padding stream blocks arranged alternately.

13. A copy protected optical disk carrying a data file copy protected according to the method of claim 1.

14. A computer readable storage device storing a data file copy protected according to the method of claim 1.

* * * * *